United States Patent [19]
Wolff et al.

[11] 3,784,114
[45] Jan. 8, 1974

[54] PROTEIN-ENRICHED WHEY FRACTIONS

[75] Inventors: Ivan A. Wolff, Oreland, Pa.; Arthur C. Stringfellow, Washington, Ill.

[73] Assignee: The United States of America as represented by the Secretary of Agriculture, Washington, D.C.

[22] Filed: June 7, 1972

[21] Appl. No.: 260,573

[52] U.S. Cl. ................................. 241/24, 241/27
[51] Int. Cl. ........................................ B02c 13/14
[58] Field of Search .............. 241/24, 27, 30, 68, 241/188 R

[56] References Cited
UNITED STATES PATENTS
2,867,387  1/1959  Dodds et al. .................. 241/188 A
3,640,475  2/1972  Jung et al. .................... 241/188 A Primary Examiner—Granville Y. Custer, Jr.
Attorney—R. Hoffman et al.

[57] ABSTRACT

Protein-enriched and lactose-enriched whey fractions are obtained by fine grinding dried whey in a pin or other impact milling device operated in the range of about 9,000 to 14,000 r.p.m. and then air classifying the fine ground whey into sized fractions in a standard air classifier.

2 Claims, No Drawings

PROTEIN-ENRICHED WHEY FRACTIONS

A non-exclusive irrevocable, royalty-free license in the invention herein described, throughout the world for all purposes of the United States Government, with the power to grant sublicenses for such purposes, is hereby granted to the Government of the United States of America.

This invention relates to a process for separating dried whey into protein-enriched and lactose-enriched fractions and more particularly to a process in which fine grinding and air classification techniques are used to make such a separation.

Whey is an important by-product of the cheese manufacturing industry and although it contains valuable carbohydrate, protein and mineral constituents less than 40 percent of the annual production in the United States is processed into human and animal food. Consequently, of the more than twenty billion pounds of whey produced in the United States each year, an extremely large amount of it is discharged into streams or into sewage and waste disposal systems where, because of its high biological oxygen demand, it becomes a pollutant. In some areas where streams and waterways are overloaded with organic matter and sewage treatment units are inadequate or expensive to construct and maintain, the problem of whey disposal has become so critical that some cheese plants may be forced to discontinue operations.

Although many uses have been proposed, the utilization and disposal of whey is still a problem. By separating whey into fractions enriched in one or another of its components, better advantage can be taken of nutritional or functional properties of specific components such as protein. Thus, procedures such as electrodialysis, reverse osmosis, ultrafiltration, and selective crystallization of the lactose sugar component have been suggested and applied to the preparation of fractions having a higher percentage of a desired constituent than is found in the parent material. However, for the most part, the proposed processes have been too costly.

An object of this invention is to provide a facile process for separating dried whey into protein-enriched and lactose-enriched fractions.

Another object of this invention is to provide a process of fine grinding and air classifying whey to obtain protein-enriched and lactose-enriched fractions.

In general, according to this invention the above objects are accomplished by fine grinding dried whey in a pin mill or other impact milling device at between about 9,000 and 14,000 r.p.m. and then air classifying the fine ground whey into sized fractions in a standard air classifier.

The separation of solid dry powdery natural materials such as wheat flour into protein-rich and protein-poor fractions by fine-grinding followed by a classification step such as classification in a controlled stream of air, is well known. The basis of such a separation is readily comprehended since the flour is derived from a heterogeneous substance, the wheat grain or berry, by dry milling steps that result in a mixture of particles with different character and composition.

One skilled in the art would not expect that similar types of separation could be effected on a solid derived from evaporation to dryness of solution containing a mixture of substances. Contrariwise, he would expect that the solid derived from such a solution would have the component substances too homogeneously dispersed in one another for differences between solid particles to be amenable to separation by air or other means of classification. This was found to be true when an attempt was made to separate dry skimmilk by fine grinding and air classification. The dry skimmilk could not be separated into protein-rich and protein-poor fractions.

Surprisingly, however, when a sample of commercially dried whey was subjected to the same fine grinding and air classification process, it separated into a protein-enriched portion and a protein-deficient portion. Although one may speculate as to why the dried whey separated and the dried skimmilk did not, the reason for the separation is not yet known.

Dried whey is derived from the manufacture of cottage and other types of cheese. Whey from cottage cheese contains somewhat greater amounts of acid than that from other types of cheese. However, the process of this invention can be used successfully on either type of whey.

Protein enrichment does not necessarily mean that the enriched fractions contain protein as the predominant component but only that they are significantly richer in protein, by several percentage points, than the starting material. It will be immediately apparent to those skilled in the art that the process of this invention can be used in conjunction with or in tandem with other separation processes, and that one may obtain a fraction containing a desired degree of protein enrichment by a stepwise procedure in which one of the steps comprises the process of this invention, that is, the fine grinding of dried whey powder coupled with air classification of the ground powder.

The invention is illustrated but not limited in scope by the following examples.

EXAMPLE 1

A commercial sweet whey product in the form of a dry powder was used. It contained 15.8% of crude protein as determined in a conventional way by the Kjeldahl procedure for percentage nitrogen and multiplying that nitrogen percentage by a factor of 6.38. The dried whey was ground by one pass through a pin mill operated at 9,000 r.p.m. and then air classified into five, sized fractions with a standard air classifier. The protein-enriched fractions represented almost half the material and contained over twice as much protein as the remaining half, i.e., the coarse residue; 23.7 vs. 10.4 percent (initially 15.8 percent protein, dry basis). The lactose showed a change of 21 percentage points between the extreme fractions with the coarse fraction (fraction 5, 56.8 percent yield) containing 76.6 percent lactose. The data on this example shown in Table I.

EXAMPLE 2

Another sample of the commercial sweet whey product used in Example 1 was treated as in Example 1 except that it was ground by a single pass through a pin mill operated at 14,000 r.p.m. The results which differed only slightly from those in Example 1 are shown in Table II.

EXAMPLE 3

A commercial sample of nonfat dry milk was treated by the procedure used in Example 1 The original sample contained 38% crude protein on a dry basis. There was no change in protein content for the various fractions. The nonfat dry milk did not separate into protein-enriched and protein-deficient fractions. This example illustrates that it would not be obvious to expect that a solid such as skimmilk or dried whey, derived from evaporation to dryness of a solution containing a mixture of substances, could be separated into protein-enriched and protein-deficient fractions.

EXAMPLE 4

A commercially dried sweet whey powder was processed as described in Example 1. The results are shown in Table III.

EXAMPLE 5

A commercially dried acid whey derived from the manufacture of cottage cheese was processed as described in Example 1. The results are shown in Table IV.

ing negates the process. It also illustrates that simply grinding and air classifying will not necessarily produce the desired results and that the process of this invention is not obvious from known prior art.

TABLE III

| Fraction | Yield % | Protein %, d.b. |
|---|---|---|
| Original whey |  | 12.6 |
| 1 | 16.5 | 19.9 |
| 2 | 7.3 | 19.2 |
| 3 | 15.4 | 17.4 |
| 4 | 16.4 | 12.4 |
| 5 | 44.4 | 8.3 |

TABLE IV

| Fraction | Yield % | Protein %, d.b. |
|---|---|---|
| Original whey |  | 12.0 |
| 1 | 13.3 | 17.0 |
| 2 | 6.7 | 16.7 |
| 3 | 26.1 | 13.8 |
| 4 | 16.6 | 14.2 |
| 5 | 37.3 | 6.9 |

TABLE I

| Fraction | Yield (%ᵃ) | Lactose (%, w.b.) | Protein (%, d.b.) | Ash (%, w.b.) | Fat (%, w.b.) | Moisture (%) |
|---|---|---|---|---|---|---|
| Original |  | 69.7 | 15.8 | 8.3 | 0.3 | 4.8 |
| 1 | 10.7 | 56 | 23.7 | 11.7 | 0.5 | 7.8 |
| 2 | 5.7 | 57 | 23.5 | 11.4 | 0.4 | 8.2 |
| 3 | 12.4 | 59 | 22.0 | 11.3 | 0.4 | 7.4 |
| 4 | 14.4 | 62 | 19.3 | 9.9 | 0.3 | 7.3 |
| 5ᵇ | 56.8 | 77 | 10.4 | 5.8 | 0.2 | 5.8 |
| Composite (cal'd) |  |  | 15.3 | 8.0 | 0.3 |  |

Product recovery = 101% of feed (8.7 lbs.).
ᵃ As percent of recovered products.
ᵇ Fraction 5 is the coarse residue.

TABLE II

| Fraction | Yield (%ᵃ) | Lactose (%, w.b.) | Protein (%, d.b.) | Ash (%, w.b.) | Fat (%, w.b.) | Moisture (%) |
|---|---|---|---|---|---|---|
| 1 | 20.0 | 61 | 21.4 | 10.5 | 0.4 | 7.5 |
| 2 | 10.7 | 60 | 20.9 | 10.3 | 0.4 | 7.0 |
| 3 | 20.6 | 64 | 18.9 | 9.5 | 0.3 | 6.3 |
| 4 | 16.8 |  | 14.9 | 8.0 | 0.2 | 5.5 |
| 5ᵇ | 31.9 | 81 | 9.3 | 5.2 | 0.2 | 4.6 |
| Composite (cal'd) |  |  | 15.9 | 8.2 | 0.2 |  |

Product recovery = 99% of feed (8.6 lbs.).
ᵃ As percent of recovered products.
ᵇ Fraction 5 is the coarse residue.

TABLE V

|  | Yield (%) | Lactose (%, w.b.) | Protein (%, d.b.) | Ash (%, w.b.) | Fat (%, w.b.) | Moisture (%) |
|---|---|---|---|---|---|---|
| Fractions 1 and 2ᶜ | 39.1 | 74 | 12.9 | 8.2 | 0.4 | 8.8 |
| Fractions 3 and 4ᶜ | 49.3 | 70 | 12.9 | 8.6 | 0.3 | 8.9 |
| Fraction 5 | 11.6 | 69 | 12.9 | 8.7 | 0.3 | 9.8 |
| Composite (cal'd) |  |  |  |  |  |  |

Product recovery = 100% of feed (3.0 lbs.).
ᶜ Taken off as one cut.

EXAMPLE 6

A sample of the commercially dried whey used in Example 1 was ground by two passes through the pin mill operated at a speed of 18,000 r.p.m. and then the ground whey was air classified in a standard air classifier. No separation of the ground whey into protein-enriched and lactose-enriched fractions was obtained. The results are shown in Table V. This example illustrates the limitations of the operating range of the process of this invention by showing that excessive grinding

We claim:

1. A process for the preparation of protein-enriched and lactose-enriched fractions from dried whey comprising fine grinding said dried whey in an impact type milling device operated at a speed in the range of about 9,000 to 14,000 r.p.m. and air classifying said ground dried whey.

2. The process of claim 1 in which the impact type milling device is a pin mill.

\* \* \* \* \*